No. 611,594.            Patented Sept. 27, 1898.
E. KEMPSHALL.
PNEUMATIC TIRE.
(Application filed June 15, 1898.)
(No Model.)
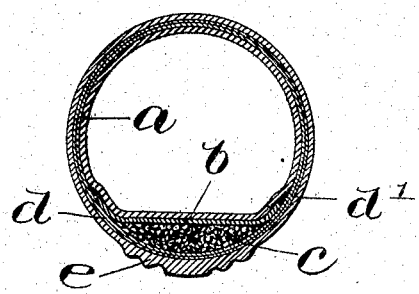
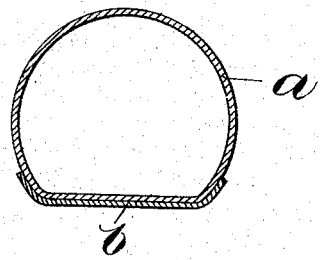
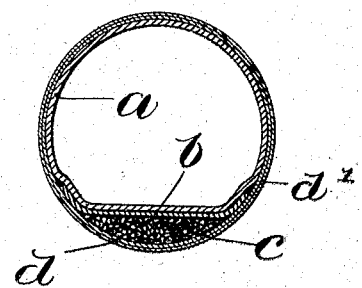
WITNESSES:
A. D. Harrison
P. W. Pezzetti
INVENTOR:
Eleazer Kempshall
J. Wright, Brown & Quinby
Att'ys

UNITED STATES PATENT OFFICE.

ELEAZER KEMPSHALL, OF NEWTON, MASSACHUSETTS.

PNEUMATIC TIRE.

SPECIFICATION forming part of Letters Patent No. 611,594, dated September 27, 1898.

Application filed June 15, 1898. Serial No. 683,483. (No model.)

*To all whom it may concern:*

Be it known that I, ELEAZER KEMPSHALL, of Newton, in the county of Middlesex and State of Massachusetts, have invented certain new and useful Improvements in Pneumatic Tires, of which the following is a specification.

This invention relates to a pneumatic tire which is provided at its tread-surface with a cushion of sponge-rubber or other suitable material to protect the air-tube of the tire against puncturing means liable to be encountered and to increase the resiliency of the tire.

The invention has for its object to provide an additional safeguard against puncturing of the air-tube in case the puncturing projection or object succeeds in penetrating the protecting-cushion.

The invention consists in the improvements which I will now proceed to describe and claim.

Of the accompanying drawings, forming a part of this specification, Figure 1 represents a cross-section of a pneumatic tire embodying my invention. Figs. 2 and 3 represent cross-sections, showing the tire at different stages of its formation.

The same letters of reference indicate the same parts in all the figures.

In the drawings, $a$ represents the inner air-tube, which is composed of rubber and is made by forming an unvulcanized rubber tube upon a rod or mandrel. Before the tube is vulcanized I apply to its outer portion a strip $b$ of any material which is impervious to air, or, in other words, which in the event of the formation of a puncture through the said strip $b$ and the air-tube will not permit the air escaping from the tube to work its way along the width of said strip. It is a fact that the strip $b$, if made of certain materials ordinarily employed in the manufacture of pneumatic tires—for instance, ordinary textile fabric with or without a coating of rubber—would permit air that may escape through a puncture made in the air-tube $a$ and in the said strip to filter, as it were, along the strip and work its way along the tire until it found a means of escape.

My invention is based upon the discovery that by using a strip $b$ of some material which will not permit air to pass through or along it in any direction I can prevent loss of air from a punctured air-tube when a cushion $c$ of sponge-rubber is placed upon the outer side of the strip $b$. To this end the strip $b$ may be made of non-extensible material, such as manila paper, glazed muslin, &c. After a strip $b$ has been placed upon the air-tube, as shown in Fig. 2, the sponge-rubber cushion $c$, which has already been partially vulcanized and rendered spongy, is placed upon the outer surface of the strip $b$, as shown in Fig. 3, and the whole is then inclosed in a suitable wrapper composed of one or more layers of frictioned fabric, such as is ordinarily used in the manufacture of pneumatic tires. I have here shown two layers—namely, an inner layer $d$ and an outer layer $d'$—the inner layer bearing upon the air-tube $a$ and upon the outer surface of the cushion $c$. Upon the outer layer $d'$ I form an external coating $e$ of unvulcanized rubber. The tire is then subjected to vulcanization and completed in the usual manner. In the completed tire the air-tube adheres closely to the air-proof strip $b$, and is thereby rendered non-extensible toward the sponge-rubber, and in the event of the penetration of the cushion and the strip $b$ into the air-tube by a penetrating instrument the air that escapes through the perforation cannot work its way through the unperforated material of the strip $b$ and toward the edges of the latter owing to the nature of the strip and can only pass through the perforation into the cushion $c$, which remains in its normal uncompressed yielding condition. Owing to the cellular nature of the cushion the perforation made in it is closed by the expansion of the walls of the cells of the cushion, so that there is no objectionable escape of air from the tube through the cushion and owing to the non-extensible strip $b$ the said cellular nature of the sponge-rubber cushion is not materially altered either by the pressure of air confined in the tube $a$ or by the slight amount of air that may escape through a puncture into a few of the cells.

I claim—

A pneumatic tire comprising an air-tube, a sponge-rubber cushion, a suitable covering for the said tube and cushion, and a strip of non-extensible air-proof material interposed between the cushion and air-tube and adapted to prevent the compression of the cells of the cushion by the pressure of air in the tube.

In testimony whereof I have affixed my signature in presence of two witnesses.

ELEAZER KEMPSHALL.

Witnesses:
A. D. HARRISON,
P. W. PEZZETTI.